Patented Aug. 18, 1925.

1,550,323

UNITED STATES PATENT OFFICE.

IWAN OSTROMISLENSKY AND MORRIS G. SHEPARD, OF NEW YORK, N. Y., ASSIGNORS TO THE NAUGATUCK CHEMICAL COMPANY, OF NAUGATUCK, CONNECTICUT, A CORPORATION OF CONNECTICUT.

STABILIZED STYROL COMPOSITION AND PROCESS FOR MAKING THE SAME.

No Drawing.   Application filed April 24, 1924.   Serial No. 708,655.

*To all whom it may concern:*

Be it known that we, IWAN OSTROMISLENSKY and MORRIS G. SHEPARD, a citizen of Russia and a citizen of the United States, respectively, both residing at New York, county of New York, and State of New York, have invented certain new and useful Improvements in Stabilized Styrol Compositions and Processes for Making the Same, of which the following is a full, clear, and exact description.

This invention relates to stabilized styrol compositions and processes for making the same.

It has been found that if styrol is stored in a dark place for approximately four months about 20–30% of it will polymerize and the resultant product has a thick gummy consistency. Heating increases the rate of polymerization of styrol or solutions of the same.

The principal object of the present invention is to provide a styrol composition which will be relatively stable during storage, and during processes of distillation involving temperatures at or somewhat above the boiling point of styrol.

The invention accordingly comprises styrol stabilized with an agent adapted substantially to prevent polymerization. It also includes a process for stabilizing styrol which comprises combining therewith an agent adapted to retard polymerization substantially without altering the concentration of the styrol. In other words where styrol is in solution the relationship of the styrol to the other materials present after addition of the agent remains practically unchanged.

As an example of a preferred form of stabilized styrol, styrol either as such or in solution is mixed with .25–1% of trinitrobenzol, based on the weight of the styrol present. Such composition stored for approximately four months shows only a trace of polymerization, the liquid still being as mobile as at the start. Such a composition also withstands heat treatment such as distillation in the presence of 1% of trinitrobenzol. Distillation of 2 to 3 hrs. at about the boiling point of styrol, 146° C., produces not more than 0.2–0.5% of polymerized styrol. On the other hand if trinitrobenzol or similar material is omitted from the styrol and the same distillation is carried out a considerable quantity (10–20%) of styrol polymerizes during the heating.

Trinitrobenzol is a representative of a class of substances which are particularly adapted for retarding polymerization. These substances are mild oxidizing agents and are identified as substances which in oxidation do not give up their oxygen in gaseous form. The class includes quinone, mononitronaphthalene trinitrotoluol, nitrobenzol, dinitrobenzol, trinitrobenzol mentioned above, and derivatives of these compounds such as pikramid. Our observations show that nitrobenzol and dinitrobenzol are not as effective as trinitrobenzol, and the substituted nitrobenzols are less effective than the unsubstituted. The substances of the class are used preferably in quantities of .25–1% based on the weight of the styrol treated.

Of the nitro compounds mentioned above, trinitrobenzol and trinitrotoluol are the most important and practical. These compounds have been found to retard polymerization up to a temperature of about 170° C. Above this temperature their action is reversed and the substances act as accelerators of polymerization. Their retarding action is substantially ineffective above the temperature of approximately 170° C.

As many apparently widely different embodiments of this invention may be made in the treatment of styrol or its homologues without departing from the spirit thereof, it will be understood that we do not intend to limit ourselves to the specific embodiment herein set forth except as indicated in the appended claims.

Having thus described our invention, what we claim and desire to protect by Letters Patent is:

1. A process for making stabilized styrol which comprises combining styrol with an organic agent adapted substantially to prevent polymerization.

2. A process for making stabilized styrol which comprises combining styrol with an organic oxidizing agent.

3. A process for making stabilized styrol which comprises combining styrol with an organic oxidizing agent which does not give up its oxygen in gaseous form.

4. A process for making stabilized styrol which comprises combining styrol with an organic oxidizing agent containing the benzene nucleus.

5. A process for making stabilized styrol which comprises combining styrol with an organic oxidizing agent containing a substituted benzene nucleus.

6. A process for making stabilized styrol which comprises combining styrol with an organic oxidizing agent containing the benzene nucleus into which nitrogen-containing groups have been introduced.

7. A process for making stabilized styrol which comprises combining styrol with an organic cyclic nitrogen-containing compound.

8. A process for making stabilized styrol which comprises combining styrol with trinitrobenzene.

9. Styrol stabilized with an organic agent adapted substantially to prevent polymerization.

10. Styrol stabilized with an organic oxidizing agent.

11. Styrol stabilized with an organic oxidizing agent which does not give up its oxygen in gaseous form.

12. Styrol stabilized with an organic oxidizing agent containing the benzene nucleus.

13. Styrol stabilized with an organic oxidizing agent containing a substituted benzene nucleus.

14. Styrol stabilized with an organic oxidizing agent containing the benzene nucleus into which nitrogen-containing groups have been introduced.

15. Styrol stabilized with an organic cyclic nitrogen-containing compound.

16. Styrol stabilized with trinitrobenzene.

Signed at New York, New York, this 18th day of April, 1924.

IWAN OSTROMISLENSKY.
MORRIS G. SHEPARD.